Dec. 29, 1970  J. S. KUSLICH  3,550,304
FISHING LURE
Filed Aug. 5, 1968  2 Sheets-Sheet 2
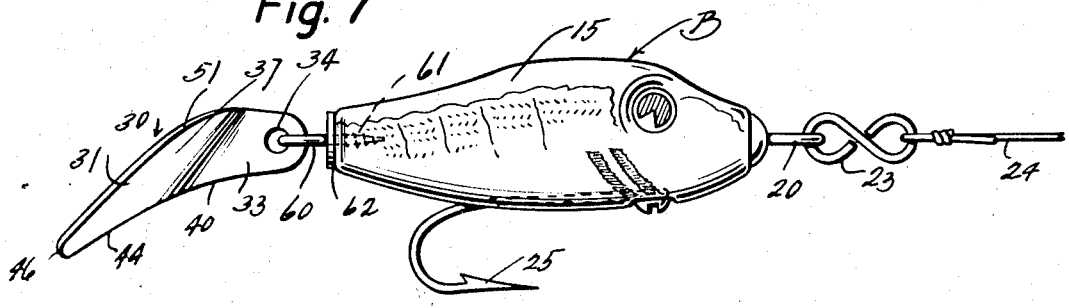
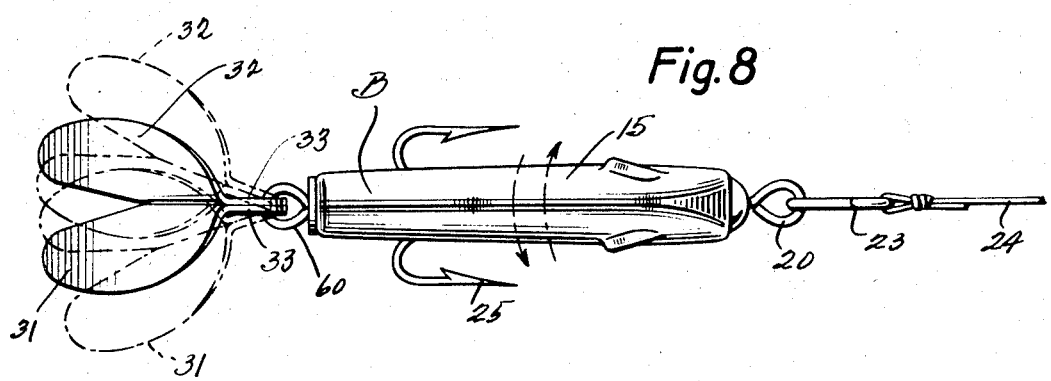
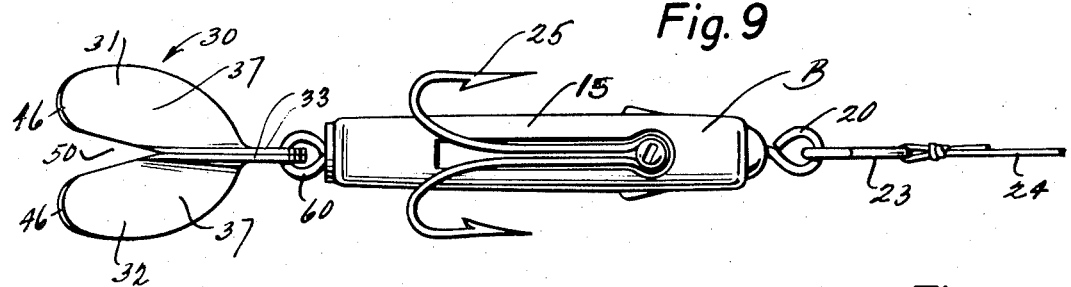
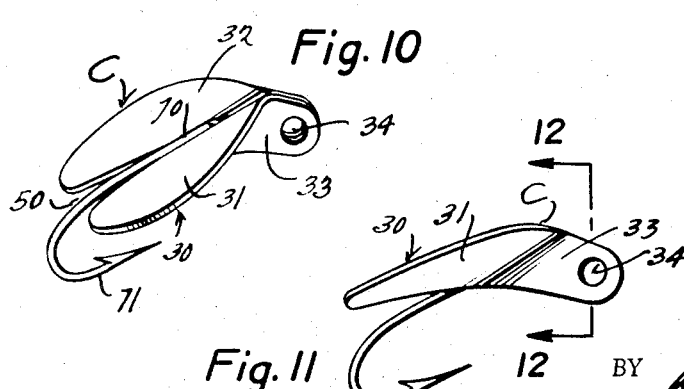
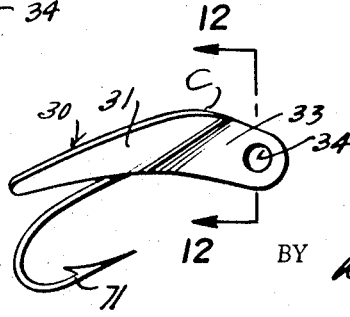
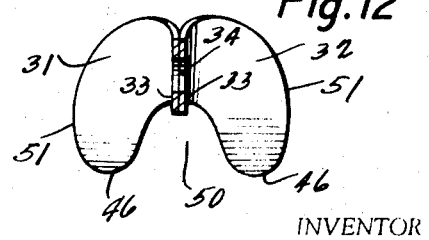
INVENTOR
John S. Kuslich
BY Rommel and Rommel
ATTORNEYS

United States Patent Office 3,550,304
Patented Dec. 29, 1970

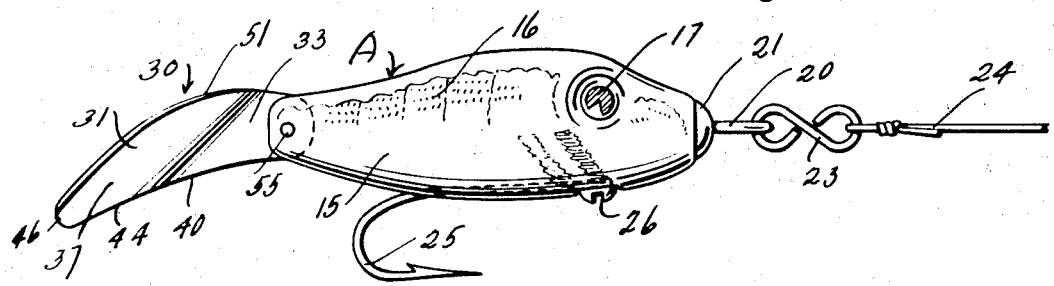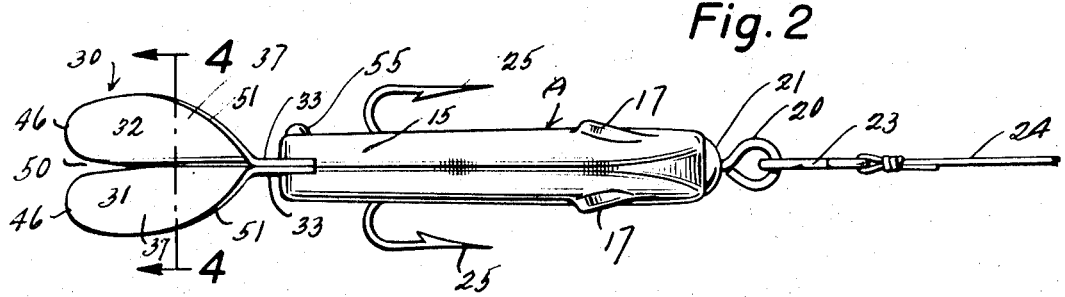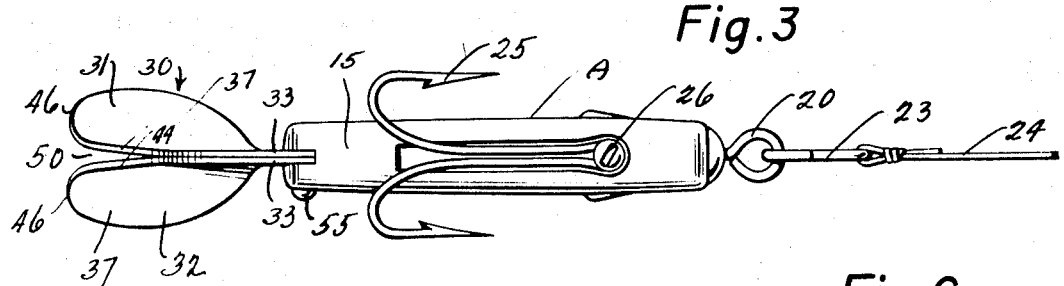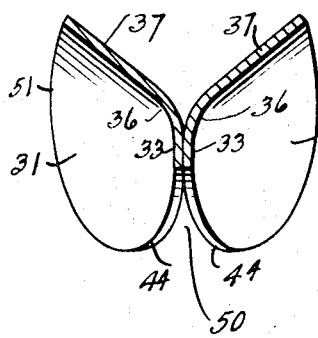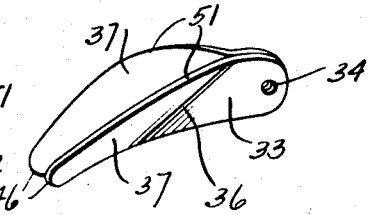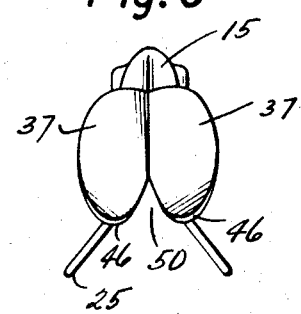

3,550,304
FISHING LURE
John Stephen Kuslich, 1064 Argyle St.,
St. Paul, Minn. 55103
Filed Aug. 5, 1968, Ser. No. 750,170
Int. Cl. A01k *85/00*
U.S. Cl. 43—42.15                  3 Claims

ABSTRACT OF THE DISCLOSURE

A fishing lure having an action member at the tail end thereof in a form of opened wing plates which can be rigidly or swivelly or pivotally attached to the body of a lure and in such relation to the dimensional characteristics of the body that during trolling action the wings will move laterally and give an appearance of action to lure body as well as twisting action to the lure body about its lateral and longitudinal axes.

---

This invention relates to a fishing lure having an action member which is of such construction as to have a lateral movement in the water while being trolled with a slightly rotary twisting movement.

The primary object of this invention is the provision of a fishing lure having a lure body, preferably elongated, which has means at the front end for attaching a trolling line, hook means attached thereto, and a tail piece in the form of opened wings which may be rigidly or swivelly or pivotally attached to the rear end of the body and which has laterally-extended right and left wing portions so constructed that during trolling or during a directional change of the lure the wings will move laterally and give a twisting action to the lure body about its longitudinal axis.

Other objects and advantages of the invention will be apparent during the course of the following detailed description.

In the accompanying drawings forming part of this specification, and wherein similar reference characters designate corresponding parts throughout the several views.

FIG. 1 is a side elevation of one form of the improved fishing lure.

FIG. 2 is a top plan view of the lure of FIG. 1.

FIG. 3 is a bottom plan view of the fishing lure of FIG. 1.

FIG. 4 is an enlarged cross sectional view taken through the action plate or member at the rear of the lure body; the view taken substantially on the line 4—4 of FIG. 2.

FIG. 5 is a perspective view of the action plate or member.

FIG. 6 is a rear elevation of the fishing lure of FIG. 1.

FIG. 7 is a side elevation of another form of fishing lure in which the action member is pivotally connected at the rear end of a lure body.

FIG. 8 is a plan view of the form of lure as shown in FIG. 7, showing in dot-and-dash lines the path of lateral deflection of the wings and the manner (arrows) in which the body may be twisted upon lateral deflection of the wings.

FIG. 9 is a bottom plan view of the lure of FIG. 7.

FIG. 10 is a perspective view showing the action plate in the form of a complete lure assemblage to which a line may be attached, and which has a hook attached to it.

FIG. 11 is a side elevation of the lure of FIG. 10.

FIG. 12 is a cross sectional view taken substantially on the line 12—12 of FIG. 11 with the hook omitted.

In the drawings, wherein for the purpose of illustration are shown different forms of the invention, the letter A may designate the form of invention shown in FIGS. 1 to 6 inclusive; the letter B the form of invention shown in FIGS. 7, 8 and 9, and the letter C the form of invention shown in FIGS. 10, 11 and 12.

In the form of invention A shown in FIGS. 1 to 6 inclusive, the fishing lure generally includes an elongated lure body 15 whch may be in the form of a minnow. This minnow body has molded-in scales shown at 16 and eyes 17. At the front end of body 15 there is a screw eye 20 and a segmental plate 21; the screw shank is not shown, but it is screwed into the front end of the body 15. To this hook or eye 20 may be attached any approved connector, such as shown at 23, and a casting or trolling line 24. In the forms of invention A and B hook means 25 may be attached as at 26 to the bottom or the body 15.

The body 15 at its rear end is provided with an action member 30 to give lateral and axial twisting motions to itself and the body of the lure as it is drawn through the water during trolling or casting.

With respect to the action member 30, the structure thereof is identical in all forms A, B and C of the invention. Therefore the same reference characters will be applied to parts of the action plate for each of the forms A, B and C. It will be noted that the action plate 30 is composed of wing members 31 and 32 each having a normally vertical plate front portion 33. They may be welded or soldered or otherwise secured together in abutment. They are provided with a transverse opening 34 therethrough. The rear portions of portions 33 decrease in height, curving at 36 laterally outwardly to provide the opened wing plate portions 37. The plate portions 33 concavely curve at their lower edges 40 in a downward direction from normal horizontal position and arcuately merge into the lower concaved edges 44 of the opened wing portions 37. In plan view, it will be noted in FIG. 2 and elsewhere that the rear edges 46 of the opened wing portions 37 are convex. The rear ends of the plate portions 37 at the facing edges 44 diverge in V-shaped relation to provide a rear opened space 50, as shown in FIGS. 2 and 3; the outer side edges of the opened wing portions 37 are convexly curved at 51 into merging relation with the edges of plate portions 33. As shown in FIG. 4, the plate portions 37 in relative cross section define a V-shaped channel. The wings 31 and 32 are of the same thickness throughout and they may be of plastic, metal or any other suitable rigid material.

In the form shown in FIG. 1, the opening 34 of the action plate is secured by a pin or rivet 55 in a socket or recess of the lure body 15. In other words, the body of the lure and the action plate are rigidly connected in the position shown in FIG. 1 and it will be noted that edges 40 and 44 convexly slope downwardly from the horizontal. It will also be noted that the wings 37 when opened catch the forward stream or body of water through which the lure is trolled and tend to cause lateral deflection of the lure body upon changing the angle of trolling or casting.

In the form of invention B, the same numerals above given to the form of invention A apply, except in so far as the attachment of the action member 30 to the lure body 15 is concerned. For this form of invention, a screw eye is used for attachment of the action member 30. It has a loop 60, screw threaded shank 61 and stop plate 62, as shown in FIG. 7; the screw eye or loop 60 being horizontal. The loop is loosely threaded through a larger opening 34 of the action member 30. With this construction, the action member 30 may move vertically and laterally and turned at an angle with respect to the plane of loop 60 to limited rotary degree. The lateral movement of the wing member is shown in dot-and-dash in FIG. 8. It will be noted that due to the roundness of the loop 60 when the lure is being drawn at changed angle through the water the opening 34 when in contact with the edge of eye 60 will cause a turning movement of the body of the lure in one or the other direction according to the angle which the line is pulling the lure. The arrows in FIGS. 8 show the direction in which the body 16 may be turned or twisted on its longitudinal axis as the wings are deflected laterally to one side or the other.

In the form of invention C as shown in FIGS. 10 and 11 and C, the action plate or member is of identical construction with respect to the above described forms A and B except that the shank 70 of a hook 71 is placed between the spaced wings and secured, as by welding or by soldering or otherwise, to the plate portions 33 and 37 in the bottom of the V-shaped recess between the wing portions 37; the hook end, of course, being turned downwardly and forwardly at its point, as shown in FIGS. 10 and 11.

From the foregoing it will be seen that the lure body and the action member imparts lateral, vertical and twisting action to the lure parts; the wobble of the wings causing the body to turn and twist laterally and longitudinally.

The lure features of this invention can be used as part of casting flies, streamers, buck tails or feathers or in connection with spoon and spinners.

Various changes in the shape, size, and arrangement of parts may be made to the forms of invention herein shown and described, without departing from the spirit of the invention or the scope of the claims.

I claim:

1. As an article of manufacture of fishing lure deflector constructed of rigid material consisting of a pair of relatively open wing plates connected together at their forward ends and therefrom sloping downwardly and laterally away from each other to the rear, said wing plates at their forward ends having vertical plate portions which are connected together in parallel abutment and at their rear portions comprising laterally disposed plate portions normally extended downwardly from the horizontal and space divided divergently at the rear ends to define a rearwardly open V-shaped recess.

2. In a fishing lure the combination of a lure body having a hook connected therewith and on its front end having means for connecting a fishing line, the rear end having a tailpiece connecting loop attached therewith provided with a horizontally positioned opening therein, and a tailpiece of rigid material having a front vertical plate portion with a lateral normally vertically positioned opening therein through which the loop is loosely connected so the tail portion can freely swing laterally at each side and in a vertical plane with a limited degree of turning action on its connection with the loop, the tailpiece rearwardly of the front vertical portion and vertically connected therewith having laterally extended, divergent rigid wings which have a normal downward appreciable slope, whereby as the lure is drawn through the water the wings will cause a lateral movement of the lure body according to the direction of pull of the fishing line.

3. The fishing lure of claim 2 in which the laterally extended divergent rigid wings are curved outwardly and downwardly at their locations in line with the vertical plate portion and said wings at their rearmost ends are divergently spaced.

References Cited

UNITED STATES PATENTS

| 1,320,804 | 11/1919 | Squarebriggs | 43—42.47X |
|-----------|---------|--------------|-----------|
| 1,792,366 | 2/1931  | Ettles       | 43—42.47X |
| 2,112,901 | 4/1938  | Anderson     | 43—42.47X |
| 2,473,644 | 6/1949  | Groza        | 43—43.13  |
| 2,509,179 | 5/1950  | Warnock      | 43—42.3   |
| 2,523,831 | 9/1950  | Koski        | 43—42.47X |
| 2,639,537 | 5/1953  | Wagner       | 43—42.5X  |
| 3,034,249 | 5/1962  | Hawks        | 43—42.15  |
| 3,137,959 | 6/1964  | Wernett      | 43—43.13X |
| 3,236,000 | 2/1966  | Pippert      | 43—42.18  |

SAMUEL KOREN, Primary Examiner

D. J. LEACH, Assistant Examiner

U.S. Cl. X.R.

43—42.18, 42.47, 42.5